United States Patent
Ishibashi

(10) Patent No.: US 10,816,058 B2
(45) Date of Patent: Oct. 27, 2020

(54) TORSIONAL VIBRATION DAMPER AND MANUFACTURING METHOD THEREOF

(71) Applicant: TOYOTA JIDOSHA KABUSHIKI KAISHA, Toyota-shi, Aichi (JP)

(72) Inventor: Masayuki Ishibashi, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/276,988

(22) Filed: Feb. 15, 2019

(65) Prior Publication Data

US 2019/0285136 A1    Sep. 19, 2019

(30) Foreign Application Priority Data

Mar. 16, 2018 (JP) .................................. 2018-48999
Jul. 18, 2018 (JP) .................................. 2018-134869

(51) Int. Cl.
*F16F 15/14* (2006.01)
*F16F 15/315* (2006.01)

(52) U.S. Cl.
CPC ...... *F16F 15/1457* (2013.01); *F16F 15/3156* (2013.01); *F16F 2224/0208* (2013.01); *F16F 2226/02* (2013.01); *F16F 2226/04* (2013.01)

(58) Field of Classification Search
CPC ...... F16F 15/14; F16F 15/1407; F16F 15/145; F16F 15/1457; F16F 15/1485
See application file for complete search history.

(56) References Cited

U.S. PATENT DOCUMENTS

| 6,315,455 B1* | 11/2001 | Tanaka | F16C 33/32 384/492 |
|---|---|---|---|
| 2010/0319642 A1* | 12/2010 | Fujita | C21D 1/25 123/90.44 |
| 2015/0251957 A1* | 9/2015 | Funaki | F16C 33/32 501/89 |
| 2016/0169318 A1* | 6/2016 | Miyahara | F16F 15/145 188/378 |
| 2017/0210165 A1* | 7/2017 | Kawamura | B60B 27/02 |
| 2017/0234401 A1 | 8/2017 | Horita et al. | |
| 2018/0119773 A1* | 5/2018 | Nishida | F16F 15/145 |
| 2019/0048971 A1* | 2/2019 | Nishida | F16F 15/145 |
| 2019/0048972 A1* | 2/2019 | Iwagaki | F16F 15/1457 |
| 2019/0170212 A1* | 6/2019 | Ishibashi | F16F 15/1457 |

FOREIGN PATENT DOCUMENTS

| CN | 107654572 A | 2/2018 |
| JP | 2017-145857 A | 8/2017 |

* cited by examiner

*Primary Examiner* — Richard W Ridley
*Assistant Examiner* — Brian J McGovern
(74) *Attorney, Agent, or Firm* — Oliff PLC

(57) ABSTRACT

A torsional vibration damper in which a vibration damping performance is enhanced without increasing a manufacturing cost. A torsional vibration damper damps torsional vibrations by a relative rotation between a rotary member and an inertia body. Hardness of the contact surface of any one of the inertia body and a rolling mass is harder than the contact surface of the other one. Smoothness of the contact surface of any one of the inertia body and the rolling mass is smoother than the contact surface of the other one.

5 Claims, 5 Drawing Sheets

Fig. 3

| Member | Material | Processing Method |
|---|---|---|
| Rolling Mass | SC45C | Cutting |
| Inertia Body | SKD11 | Pressing |
| Rotary Member | SKD11 | Pressing |

Fig. 5

| Parameter | Before Polishing | After Polishing |
|---|---|---|
| Ra | 0.8~1.6 μm | ~0.5 μm |
| Rz | 3.2~6.3 μm | ~2.0 μm |
| Rpk | 0.6 μm~ | ~0.4 μm |
| Rk | 1.0 μm~ | ~0.8 μm |

TORSIONAL VIBRATION DAMPER AND MANUFACTURING METHOD THEREOF

The present invention claims the benefit of Japanese Patent Applications No. 2018-48999 filed on Mar. 16, 2018, and No. 2018-134869 filed on Jul. 18, 2018 with the Japanese Patent Office, the disclosures of which are incorporated herein by reference in their entirety.

BACKGROUND

Field of the Invention

Embodiments of the present disclosure relate to the art of a torsional vibration damper that reduces a torsional vibration resulting from a pulsation of an input torque, and a manufacturing method thereof.

Discussion of the Related Art

JP-A-2017-145857 describes one example of a torsional vibration damper for reducing torsional vibrations resulting from torque pulse by an inertia torque of an inertial mass. The damper taught by JP-A-2017-145857 comprises a rotary member rotated by a torque, an inertial member rotated relatively to the rotary member by a torque pulse, and a connection member as a rolling mass connecting the rotary member and the inertial member in a torque transmittable manner. A plurality of guide holes are formed in a circular manner on the inertial member, and the rolling mass is held in each of the guide holes. When the rotary member is rotated, each of the rolling mass is centrifugally pushed onto a radially outer portion of an inner edge of the guide hole as a raceway surface while being oscillated by the torque pulse.

As a result, the rotary member and the inertial member are rotated relatively to each other by the oscillating motions of the rolling masses to damp torsional vibrations resulting from the torque pulse. In order to enhance such vibration damping performance of the damper, it is preferable to allow the rolling mass to oscillate smoothly. For example, the rolling mass may be allowed to oscillate smoothly by smoothing a surface roughness of the raceway surface of the guide hole. In addition, it is more preferable to smoothen a contact surface of the rolling mass. In other words, in order to allow the rolling mass to oscillate smoothly, it is necessary to reduce a friction coefficient between the raceway surface and the contact surface of the rolling mass.

However, a man-hour and a manufacturing cost of the damper would be increased as a result of smoothing the raceway surface and the contact surface of the rolling mass. Nonetheless, an intended damping performance may not be achieved, or the vibration damping performance of the damper may not be enhanced without reducing the friction coefficient between the raceway surface and the contact surface of the rolling mass.

SUMMARY OF THE INVENTION

The present disclosure has been conceived noting the foregoing technical problems, and it is therefore an object of the present disclosure is to enhance a vibration damping performance of a torsional vibration damper without increasing a manufacturing cost significantly.

According to one aspect of the present disclosure, there is provided to a torsional vibration damper comprising: a rotary member that is rotated by a torque applied thereto; an inertia body that is disposed on radially outer side of the rotary member while being allowed to rotate around a rotational center axis of the rotary member; and a rolling mass that couples the rotary member and the inertia body in a relatively-rotatable manner so as to damp torsional vibrations resulting from a change in the torque applied to the rotary member by a relative rotation between the rotary member and the inertia body. The inertia body comprises a contact surface and the rolling mass comprises a contact surface and the contact surface of the inertia body and the contact surface of the rolling mass are contacted to each other. In order to achieve the above-explained objective, according to the embodiment of the present disclosure, hardness of the contact surface of any one of the inertia body and the rolling mass is harder than the contact surface of the other one of the inertia body and the rolling mass. In addition, smoothness of the contact surface of said any one of the inertia body and the rolling mass is smoother than the contact surface of the other one of the inertia body and the rolling mass.

In a non-limiting embodiment, a surface roughness of the contact surface may be evaluated by at least one of parameters including a calculated average roughness Ra, a roughness Rz at the maximum height, a reduced peak height Rpk, and a core roughness depth Rk. Specifically, the surface roughness of the contact surface may be polished in such a manner as to reduce at least any one of the calculated average roughness Ra smaller than 0.5 μm, the roughness Rz at the maximum height smaller than 2.0 μm, the reduced peak height Rpk smaller than 0.4 μm, and the core roughness depth Rk smaller than 0.8 μm.

In a non-limiting embodiment, the contact surface of the rolling mass may include an outer circumferential face.

According to another aspect of the present disclosure, there is provided to a manufacturing method of the torsional vibration damper comprising: selecting material of the contact surface of any one of the inertia body and the rolling mass that is harder than material of the contact surface of the other one of the inertia body and the rolling mass; polishing the contact surface of said any one of the inertia body and the rolling mass smoother than the contact surface of the other one of the inertia body and the rolling mass; and thereafter assembling the rolling mass with the inertia body.

Thus, according to the embodiment of the present disclosure, hardness of the contact surface of any one of the inertia body and the rolling mass is harder than the contact surface of the other one of the inertia body and the rolling mass, and smoothness of the contact surface of said any one of the inertia body and the rolling mass is smoother than the contact surface of the other one of the inertia body and the rolling mass. That is, a coefficient of friction of the contact surface that is harder than the other contact surface is smaller than a coefficient of friction of the other contact surface. According to the embodiment of the present disclosure, therefore, the rolling mass centrifugally pushed onto a raceway surface of the inertia body is allowed to oscillate smoothly along the raceway surface in a desired order to enhance vibration damping performance of the torsional vibration damper.

As described, any one of the inertia body and the rolling mass is made of harder material than the other one. According to the embodiment of the present disclosure, therefore, abrasion of the contact surface of the inertia body or the rolling mass made of softer material due to oscillation of the rolling mass is expedited, and eventually the surface roughness of the softer contact surface will be substantially equalized to the harder contact surface. That is, the vibration damping performance of the torsional vibration damper can be enhanced by polishing only one of the inertia body and the rolling mass, as the case of polishing both of the inertia body and the rolling mass. In addition, since only the contact surface of any one of the inertia body and the rolling mass is polished, a processing cost can be reduced compare to the conventional art in which both of the inertia body and the rolling mass are polished. As a result, a manufacturing cost of the torsional vibration damper can be reduced. Further, a man-hour for manufacturing the torsional vibration damper may also be reduced.

Further, given that the rolling mass is made of material harder than material of the rotary member, a surface of the rotary member contacted to the rolling mass may also be smoothened by a centrifugal displacement of the rolling mass. As a result, roughness of the surface of the rotary member contacted to the rolling mass will also be equalized to that of the rolling mass. Acceding to the embodiment of the present disclosure, therefore, members involving vibration damping action of the torsional vibration damper are allowed to move smoothly in the torsional vibration damper.

According to the manufacturing method of the present disclosure, the contact surface of any one of the inertia body and the rolling mass is formed using the material harder than the material of the contact surface of other one of the inertia body and the rolling mass, and the contact surface of said any one of the inertia body and the rolling mass is polished smoother than the contact surface of the other one of the inertia body and the rolling mass. Thereafter, the torsional vibration damper is assembled using the rolling mass and the inertia body thus prepared. According to the manufacturing method of the present disclosure, therefore, the torsional vibration damper that can achieve the above-explained advantages can be assembled easily by the simple procedure.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing materials and processing methods of a rolling mass, an inertia body, and a rotary member;

FIG. 5 is a table showing values of parameters representing surface roughness of the raceway surface and the contact surface of the rolling mass before and after polishing the raceway surface.

DETAILED DESCRIPTION OF THE PREFERRED EMBODIMENT(S)

Figure 1:
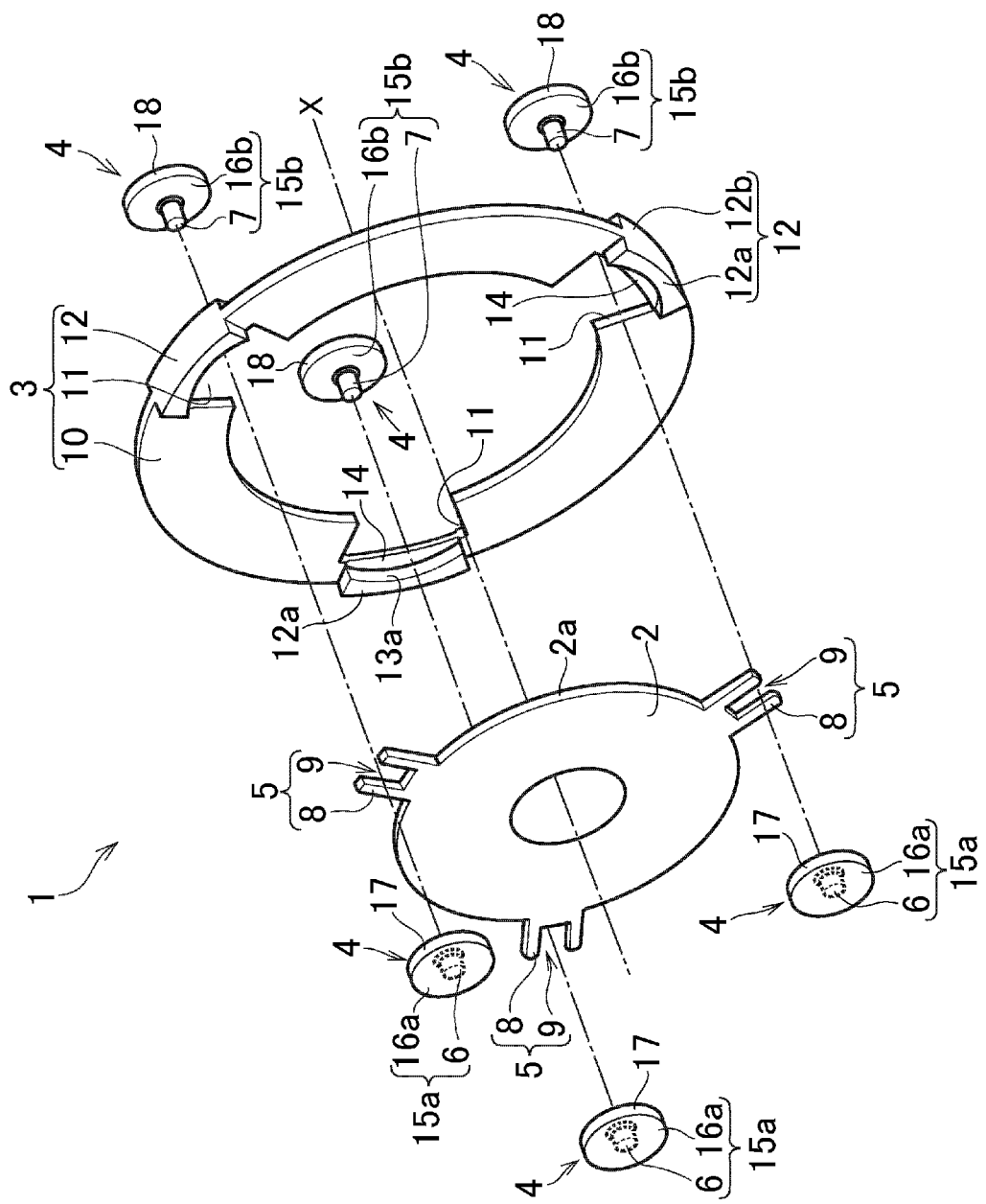
FIG. 1 is an exploded perspective view showing constitutional elements of the torsional vibration damper according to exemplary embodiment of the present disclosure.
Figure 2:
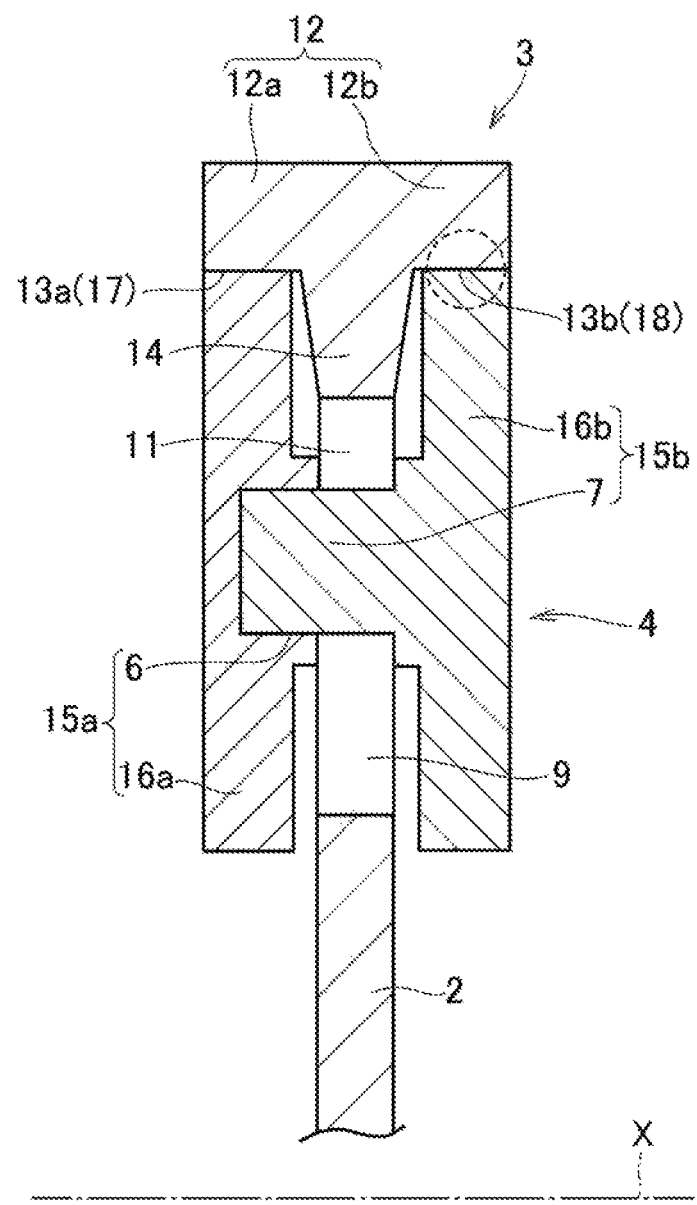
FIG. 2 is a partial cross-sectional view partially showing a cross-section the torsional vibration damper.

A preferred embodiment of the present disclosure will now be explained with reference to the accompanying drawings. For example, a torsional vibration damper according to the embodiment of the present disclosure is applied a vehicle to reduce torsional vibrations resulting from pulsation of a torque delivered from an engine to a transmission. FIG. 1 is an exploded perspective view showing constitutional elements of a torsional vibration damper 1 according to the embodiment of the present disclosure, and FIG. 2 is a partial cross-sectional view showing a cross-section of the torsional vibration damper 1 in a situation where a rolling mass is centrifugally pushed onto a raceway surface.

The torsional vibration damper 1 comprises a rotary member 2 that is rotated by a torque applied thereto, an inertia body 3 that is rotated relatively to the rotary member 2 by a torque pulse or a torque change, and a plurality of rolling mass 4 individually serving as a connection member connecting the rotary member 2 and the inertia body 3 while allowing to rotate relative to each other. As shown in FIG. 2, the rolling mass 4 has an H-shaped cross-section.

The rotary member 2 as an annular plate member has a center hole, and a crankshaft of the engine, a propeller shaft, or an axle shaft for transmitting torque to drive wheels (neither of which are shown) are inserted into the center hole. The rotary member 2 is vibrated by a pulsation or change of the torque applied thereto. In the rotary member 2, a plurality of retainers 5 are formed on an outer circumference 2a of the rotary member 2 to protrude radially outwardly.

Specifically, each of the retainers 5 comprises a pair of protrusions 8 and a guide groove 9 formed between the protrusions 8. According to the example shown in FIG. 1, three retainers 5 are formed on the outer circumference 2a of the rotary member 2 at regular intervals. As explained-later, each of the rolling mass 4 comprises a shaft portion 7, and the shaft portion 7 is retained loosely in the guide groove 9 of the retainer 5. That is, the shaft portion 7 is allowed to move between the protrusions 8 in a radial direction so that the rolling mass 4 is moved radially outwardly within the guide groove 9 by a centrifugal force established by rotating the rotary member 2. Although the number of retainers 5 is described as three in FIG. 1, the present disclosure is not limited to this, and there may be four or more, for example, or there may be two.

The inertia body 3 is adapted to establish an inertia torque for reducing torsional vibrations through the rolling masses 4. To this end, the inertia body 3 is arranged around the rotary member 2 while being allowed to oscillate. Specifically, the inertia body 3 comprises an annular plate 10, a plurality of cutouts 11, and a plurality of bridge members 12 arranged radially outer side of each of the cutouts 11. A thickness of the annular plate 10 is substantially equal to or slightly thicker than a thickness of the rotary member 2, and an inner diameter of the annular plate 10 is slightly larger than an outer diameter of the rotary member 2. The cutouts 11 are formed on inner circumferential portions of the annular plate 10 at radially outer side of the retainers 5 of the rotary member 2. That is, three cutouts 11 are formed on the annular plate 10 at regular intervals, and the retainers 5 of the rotary member 2 are held respectively in the cutout 11. For example, the bridge member 12 may be formed separately from the annular plate 10, and may be attached to the annular plate 10 from radially outer side of the cutout 11.

The bridge member 12 includes a first bulging section 12a and a second bulging section 12b that jut out to both sides in the axial direction X from the annular plate 10, and an inner circumferential face of each of the bulging section individually serves as a raceway surface 13. Specifically, an inner circumferential face of the first bulging section 12a serves as a first raceway surface 13a, and an inner circumferential face of the second bulging section 12b serves as a second raceway surface 13b. A circumferential length of the bridge member 12 is substantially identical to a width of the cutout 11 in a circumferential direction, and a curvature of an outer circumferential face of the bridge member 12 is substantially identical to a curvature of an outer circumference of the annular plate 10. When the annular plate 10 is rotated together with the rotary member 2, the rolling mass 4 oscillates within the raceway surface 13 of the bridge member 12.

Specifically, a curvature radius of each of the first raceway surface 13a and the second raceway surface 13b is individually shorter than a curvature radius of the outer circumferential face of the bridge member 12. That is, a center of curvature of the raceway surface 13 is situated in radially outer side of a center of curvature of the inertia body 3.

In the annular plate 10, a connection portion 14 is formed individually on radially outer side of each of the cutouts 11. In other words, each of the cutout 11 is formed by cutting out a radially inner portion of the connection portion 14. After attaching the bridge member 12 to the annular plate 10, the connection portion 14 is interposed between the first bulging section 12a and the second bulging section 12b.

The rolling mass 4 also serves as a transmission member that transmits torque of the rotary member 2 to the inertia body 3. A structure of the rolling mass 4 is shown in FIG. 2 in more detail. As illustrated in FIG. 2, the rolling mass 4 is a column or cylindrical member having an H-shaped cross-section. According to the embodiment, the rolling mass 4 is formed by combining a first mass member 15a as a female member and a second mass member 15b as a male member. As described, the shaft portion 7 of the rolling mass 4 is retained loosely in the guide groove 9 of the retainer 5 that is formed on the rotary member 2 and held in the cutout 11 of the inertia body 3.

Specifically, the first mass member 15a comprises a hole 6 formed e.g., on a center of an inner surface of the first mass member 15a, and a diametrically larger flange portion 16a formed around the hole 6. On the other hand, the second mass member 15b comprises the above-mentioned shaft portion 7 formed e.g., on a center of an inner surface of the second mass member 15b to protrude toward the first mass member 15a, and a diametrically larger flange portion 16b formed around the shaft portion 7. As illustrated in FIG. 2, the rolling mass 4 is formed by inserting the shaft portion 7 of the second mass member 15b into the hole 6 of the first mass member 15a between the protrusions 8 of the retainer 5 serving as the guide groove 9. A length of the shaft portion 7 of the rolling mass 4 is longer than a thickness of the rotary member 2 and a thickness of the connection portion 14 of the annular plate 10. In other words, a clearance between the flange portion 16a of the first mass member 15a and the flange portion 16b of the second mass member 15b is wider than the thickness of the rotary member 2 and the thickness of the connection portion 14 of the annular plate 10. An outer diameter of the shaft portion 7 is slightly smaller than a width of the guide groove 9 of the rotary member 2.

When the rotary member 2 is rotated, the rolling mass 4 is centrifugally displaced radially outwardly within the guide groove 9 of the retainer 5. In this situation, the shaft portion 7 of the rolling mass 4 is guided by the protrusions 8 serving as the guide groove 9. Consequently, as illustrated in FIG. 2, an outer circumferential face 17 of the first mass member 15a is pushed onto the first raceway surface 13a of the bridge member 12, and an outer circumferential face 18 of the second mass member 15b is pushed onto the second raceway surface 13b of the bridge member 12. In this situation, if the rolling mass 4 is moved in the axial direction, the flange portion 16a of the first mass member 15a or the flange portion 16b of the second mass member 15b is brought into contact to the rotary member 2 and the connection portion 14 of the annular plate 10 thereby preventing a detachment of the rolling mass 4 from the torsional vibration damper 1. Accordingly, the raceway surfaces 13a and 13b, and the outer circumferential faces 17 and 18 "the contact surface" of the disclosure.

In this situation, the rolling mass 4 is oscillated along the raceway surfaces 13a and 13b by a change in the torque rotating the rotary member 2. Consequently, a relative rotation is caused between the rotary member 2 and the inertia body 3 thereby damping torsional vibrations. In order to allow the rolling mass 4 to oscillate smoothly on the raceway surfaces 13a and 13b thereby enhancing such vibration damping performance of the torsional vibration damper 1, it is preferable to smoothen any one of the contact surfaces between the rolling mass 4 and the raceway surface 13 of the bridge member 12 attached to the inertia body 3.

To this end, according to the embodiment of the present disclosure, the raceway surface 13 (as will be also called the "plateau surface") of the bridge member 12 to which the rolling mass 4 is contacted is smoothened. That is, a surface roughness (or a surface texture) of the raceway surface 13 is reduced smaller than a surface roughness (or a surface texture) of the outer circumferential faces 17 and 18 of the rolling mass 4. In other words, a coefficient of friction of the raceway surface 13 is reduced smaller than a coefficient of friction of the outer circumferential faces 17 and 18 of the rolling mass 4. In addition, according to the embodiment of the present disclosure, at least the raceway surfaces 13a and 13b of the bridge member 12 are made of material harder than material of the rolling mass 4.

Material and processing methods of the rotary member 2, the inertia body 3, and the rolling mass 4 are shown in FIG. 3. As can be seen from FIG. 3, the rotary member 2 and the inertia body 3 are made of alloy tool steel of SKD 11 whose hardness and abrasion resistance are relatively high. On the other hand, the rolling mass 4 is made of carbon steel S45C. Thus, the rotary member 2 and the inertia body 3 are made of same material, and both of the rotary member 2 and the inertia body 3 are formed by a pressing method. On the other hand, the rolling mass 4 is formed by a cutting method. As described, the bridge member 12 is formed separately from the inertia body 3, and the bridge member 12 is also formed of alloy tool steel of SKD 11, and may be formed e.g., by the cutting method.

According to the embodiment of the present disclosure, the raceway surface 13 of the bridge member 12 or the outer circumferential faces 17 and 18 of the rolling mass 4 is/are polished or smoothened prior to assemble the rolling mass 4 with the rotary member 2 and the inertia body 3. In this embodiment, specifically, the raceway surface 13 of the bridge member 12 is polished or smoothened prior to assemble the rolling mass 4 with the rotary member 2 and the inertia body 3. For example, the raceway surface 13 of the bridge member 12 may be polished by a barrel finishing, a chemical finishing, an electrochemical polishing, a shot peening, and so on. In a case of barrel finishing, a barrel containing a workpiece, a media such as an abrasive and stone, and a compound is rotated or vibrated so that the workpiece is frictionally polished or burnished by the abrasive and the compound. For example, a fluid barrel finishing, a centrifugal barrel finishing, a vibration barrel finishing, and a rotation barrel finishing are available.

According to the embodiment of the present disclosure, the raceway surface 13 of the bridge member 12 is smoothened by rotating or vibrating a barrel containing the bridge member 12, the media, and the compound. Specifically, triangular-shaped, column-shaped, or spherical-shaped media containing plastic or metal or the like is used, and the media is mixed with the workpieces in a ratio of 1 to 4 (workpieces:media=1:4). Such ratio may be altered according to a required surface roughness and hardness.

The raceway surface 13 of the bridge member 12 may also be smoothened by the chemical finishing. In this case, a workpiece is soaked in chemical solution (e.g., acid solution) to melt a surface of the workpiece so that a portion of the workpiece contacted to the solution is etched homogeneously. For this reason, the chemical finishing is useful if the workpiece has a complicated contour such as a curved surface which is difficult to polish. A length of time to soak the workpiece in the solution may be adjusted according to a required surface roughness and hardness of the workpiece. The raceway surface 13 of the bridge member 12 may also be smoothened by the electrochemical polishing. In this case, a container containing electropolishing solution serves as a cathode, and a workpiece soaked in the solution serves as an anode. A surface of the workpiece is etched by applying current to the container and the workpiece. In this case, therefore, only a desired portion of the workpiece, for example, the raceway surface 13 of the bridge member 12 may be polished by soaking only the raceway surface 13 of the bridge member 12. A length of time to soak the workpiece in the solution, and a current value applied to the container and the workpiece may be adjusted according to a required surface roughness and hardness of the workpiece.

The raceway surface 13 of the bridge member 12 may also be smoothened by the shot peening. In this case, a surface of the workpiece is smoothened by impacting the surface with shot (e.g., round metallic). Consequently, the surface of the workpiece is hardened by work-hardening of the surface resulting from plastic deformation, homogenization of stress on the surface, and compressive residual stress on the surface. For this purpose, the shot may be selected from grains whose diameter falls within a range of 0.2 mm to 1.2 mm. A shot velocity and an exposure time may be adjusted according to a required surface roughness and hardness of the workpiece. If it is required to burnish the surface of the workpiece more finely, the surface of the workpiece may be smoothened by a fine particle peening. In this case, shot whose diameter is smaller than 0.2 mm is used, and a shot velocity is higher compared to the normal shot peening.

The raceway surface 13 of the bridge member 12 may also be smoothened by a polishing (or a lapping). In this case, a surface of the workpiece and a lap are rubbed together with an abrasive between those members. Specifically, the surface of the workpiece is polished roughly using a lap made of cast iron and a relatively large abrasive whose grain diameter is several micrometer to several tens micrometer, and then polished finely using a lap made of soft material such as felt or plastic and a relatively small abrasive whose grain diameter is smaller than 1 micrometer. An abrasive, polishing solution, a rubbing speed, a rubbing pressure etc. may be selected according to a required surface roughness and hardness of the workpiece.

Figure 4:
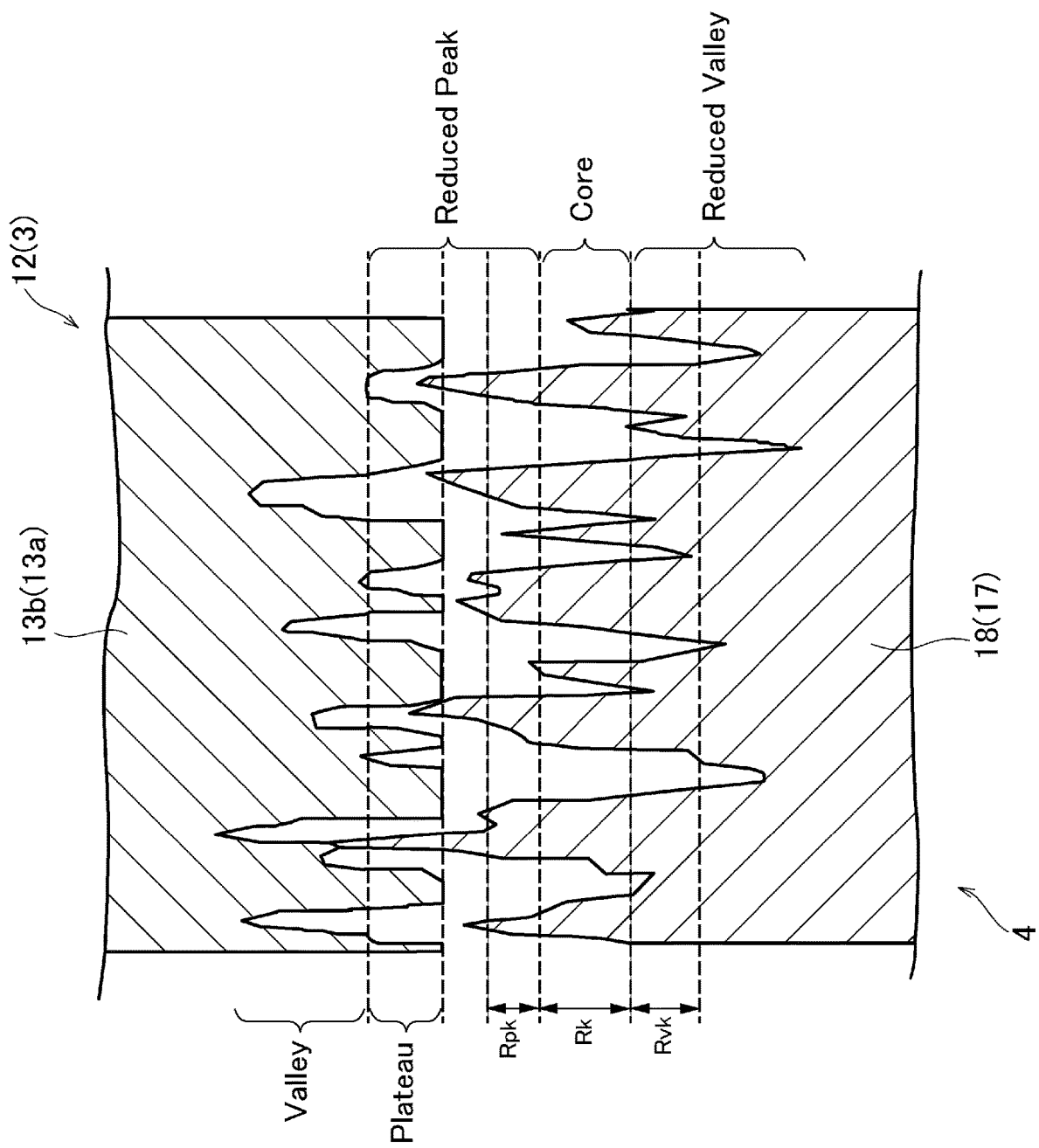
FIG. 4 is an enlarged cross-sectional view showing surface roughness of a raceway surface of the inertia body and a contact surface of the rolling mass.

FIG. 4 is a cross-sectional view showing cross-sections of portions of the bridge member 12 and the rolling mass 4 enclosed by the dashed-circle shown in FIG. 2. As can be seen from FIG. 4, the raceway surface 13 of the bridge member 12 has a plateau surface, and the plateau surface is smoothened by at least any one of the above-explained polishing methods. On the other hand, the surface of the outer circumferential face 18 of the rolling mass 4 comprises a reduced valley, a core, and a reduced peak from bottom to top.

FIG. 5 shows changes in parameters representing surface roughness of the raceway surface 13 before and after the polishing. As can be seen from FIG. 5, a calculated average roughness Ra before polishing the raceway surface 13 falls within a range from 0.8 µm to 1.6 µm. By contrast, the calculated average roughness Ra after polishing the raceway surface 13 is reduced smaller than 0.5 µm. Likewise, a roughness Rz at the maximum height before polishing the raceway surface 13 falls within a range from 3.2 µm to 6.3 µm. By contrast, the roughness Rz at the maximum height after polishing the raceway surface 13 is reduced smaller than 2.0 µm. A reduced peak height Rpk before polishing the raceway surface 13 is greater than 0.6 µm. By contrast, the reduced peak height Rpk after polishing the raceway surface 13 is reduced smaller than 0.4 µm. A core roughness depth Rk before polishing the raceway surface 13 is greater than 1.0 µm. By contrast, the core roughness depth Rk after polishing the raceway surface 13 is reduced smaller than 0.8 µm. Thus, all of the parameters representing the surface roughness of the raceway surface 13 are reduced after polishing the raceway surface 13. In other words, the raceway surface 13 is smoothened after polishing the raceway surface 13.

Specifically, Ra is a parameter defined by JIS B601 representing a calculated average roughness as an arithmetic average of the roughness profile, which is calculated by adding absolute values of differences in a height and depth between an average line and a measurement curve within a predetermined range of a surface, and averaging a total value of the absolute value. In turn, Rz is a parameter defined by JIS B601 representing a roughness at the maximum height, which is calculated by adding a maximum height Rp to a maximum depth Rv within a predetermined range of a surface (Rz=Rp+Rv).

Rpk and Rk are parameters defined by JIS B0671-2 for evaluating a surface roughness of a plateau structure. Specifically, Rpk is a reduced peak height as an average value of reduced peak heights of a measurement curve of a polished surface within a predetermined range. On the other hand, Rk is a core roughness depth as a difference between an upper level (i.e., the reduced peak height) and a lower level (i.e., the reduced valley) of a measurement curve of a polished surface.

In the plateau structure shown in FIG. 4, the parameters Rpk, Rk, and Rvk are employed to indicate surface roughness of the outer circumferential face 18 of the rolling mass 4. Specifically, Rvk is a parameter defined by JIS B0671-2 representing an average value of a reduced valley depth of the polished surface.

As described, when the rotary member 2 is rotated by torque, the rolling mass 4 is centrifugally brought into contact to the raceway surface 13, and oscillated along the raceway surface 13 by a change or pulsation of the torque. Consequently, a relative rotation between the rotary member 2 and the inertia body 3 is caused by such oscillation of the rolling mass 4, and torsional vibrations are damped by such relative rotation. In this situation, specifically, the outer circumferential faces 17 and 18 of the rolling mass 4 are contacted individually to the first raceway surface 13a and the second raceway surface 13b of the bridge member 12. In order to allow the rolling mass 4 to oscillate smoothly on the raceway surface 13, according to the embodiment of the present disclosure, only the raceway surface 13 of the bridge member 12 is polished by at least any one of the above-explained polishing methods. According to the embodiment of the present disclosure, therefore, the rolling mass 4 is allowed to oscillate in a desired order to enhance vibration damping performance of the torsional vibration damper 1.

As also described, the bridge member 12 having the raceway surface 13 is made of the material harder than the material of the rolling mass 4. For this reason, abrasion of the outer circumferential faces 17 and 18 of the rolling mass 4 due to oscillation itself is expedited, and eventually the surface roughness of the outer circumferential faces 17 and 18 of the rolling mass 4 will be substantially equalized to that of the raceway surface 13. In addition, since only the raceway surface 13 of the bridge member 12 is polished, a processing cost can be reduced compare to the conventional art in which both of the raceway surface and the contact face of the mass are polished. As a result, a manufacturing cost of the torsional vibration damper 1 can be reduced. Further, a man-hour for manufacturing the torsional vibration damper 1 may also be reduced.

Here will be explained another embodiment of the present disclosure. According to another embodiment, each of the rolling masses 4 is individually made of material harder than material of the raceway surface 13 of the bridge member 12 as a part of the inertia body 3. In addition, according to another embodiment, only the outer circumferential faces 17 and 18 of each of the rolling mass 4 are polished by at least any one of the above-explained polishing methods. In this case, the outer circumferential faces 17 and 18 of each of the rolling mass 4 are individually polished as smooth as the raceway surface 13 shown in FIG. 4. On the other hand, each of the raceway surface 13 is as rough as the outer circumferential faces 18 of the rolling mass 4 shown in FIG. 4. According to another embodiment, the outer circumferential faces 17 and 18, and the raceway surfaces 13a and 13b correspond to "one of the contact surfaces" of the disclosure.

According to another embodiment, the advantages of the foregoing embodiment may also be achieved. Specifically, abrasion of the raceway surface 13 of the bridge member 12 due to oscillation of the rolling mass 4 is expedited, and eventually the surface roughness of the raceway surface 13 will be substantially equalized to those of the outer circumferential faces 17 and 18 of the rolling mass 4. That is, the rolling mass 4 is also allowed to oscillate smoothly in a desired order to enhance vibration damping performance of the torsional vibration damper 1. In addition, a processing cost and a manufacturing cost of the torsional vibration damper 1 may also be reduced compared to the prior art.

Further, given that the rolling mass 4 is made of material harder than material of the rotary member 2, a surface of each of the protrusions 8 of the retainer 5 may also be smoothened e.g., by the shaft portion 7 of the rolling mass 4 as a result of the centrifugal displacement of the rolling mass 4. Thus, members involving vibration damping action of the torsional vibration damper 1 are allowed to move smoothly in the torsional vibration damper 1.

Although the above exemplary embodiment of the present application has been described, it will be understood by those skilled in the art that the present disclosure should not be limited to the described exemplary embodiment, and various changes and modifications can be made within the scope of the present disclosure. For example, material of the inertia body 3 and the rolling mass 4 should not be limited to SKD 11 and S45C, and may be altered according to need as long as one of the rolling mass 4 and the bridge member 12 is harder than the other one.

In addition, the surface roughness of the outer circumferential faces 17 and 18 of the rolling mass 4 and the raceway surfaces 13a and 13b of the bridge member may also be evaluated using an average height Rc of the measurement curve, a maximum cross-sectional height Rt of the measurement curve, instead of Ra, Rz, Rpk, and Rk. Here, the above-explained advantages of the present disclosure may be achieved if at least any one of those parameters is reduced after polishing the outer circumferential faces 17 and 18 or the raceway surface 13.

Furthermore, the present disclosure may also be applied to torsional vibration dampers in which a cylindrical or column-shaped rolling mass is employed. In this case, since a configuration of the rolling mass is simple, a contact face of the rolling mass can be polished easier. For this reason, a processing cost of the rolling mass may be further reduced.

What is claimed is:

1. A torsional vibration damper, comprising:
    a rotary member that is rotated by a torque applied thereto;
    an inertia body that is disposed on a radially outer side of the rotary member while being allowed to rotate around a rotational center axis of the rotary member; and
    a rolling mass that couples the rotary member and the inertia body in a relatively-rotatable manner so as to damp torsional vibrations resulting from a change in the torque applied to the rotary member by a relative rotation between the rotary member and the inertia body,
    wherein the inertia body comprises a contact surface and the rolling mass comprises a contact surface, and the contact surface of the inertia body and the contact surface of the rolling mass are contacted to each other,
    a hardness of the contact surface of any one of the inertia body and the rolling mass is harder than the contact surface of the other one of the inertia body and the rolling mass, and
    a smoothness of the contact surface of said any one of the inertia body and the rolling mass is smoother than the contact surface of the other one of the inertia body and the rolling mass.

2. The torsional vibration damper as claimed in claim 1, wherein
    a surface roughness of the contact surface of said any one of the inertia body and the rolling mass is evaluated by at least one of parameters including a calculated average roughness Ra, a roughness Rz at the maximum height, a reduced peak height Rpk, and a core roughness depth Rk, and
    the surface roughness of the contact surface of said any one of the inertia body and the rolling mass is polished in such a manner as to reduce at least any one of the calculated average roughness Ra smaller than 0.5 μm, the roughness Rz at the maximum height smaller than 2.0 μm, the reduced peak height Rpk smaller than 0.4 μm, and the core roughness depth Rk smaller than 0.8 μm.

3. The torsional vibration damper as claimed in claim 2, wherein the contact surface of the rolling mass includes an outer circumferential face.

4. The torsional vibration damper as claimed in claim 1, wherein the contact surface of the rolling mass includes an outer circumferential face.

5. A manufacturing method of a torsional vibration damper,
    wherein an inertia body comprises a contact surface and a rolling mass comprises a contact surface,
    the contact surface of the inertia body and the contact surface of the rolling mass are contacted to each other,
    the rotary member and the inertia body are allowed to rotate relative to each other to damp torsional vibrations resulting from a change in torque applied to the rotary member by a relative rotation between the rotary member and the inertia body, the manufacturing method comprising:

selecting a material of the contact surface of any one of the inertia body and the rolling mass that is harder than material of the contact surface of the other one of the inertia body and the rolling mass;

polishing the contact surface of said any one of the inertia body and the rolling mass smoother than the contact surface of the other one of the inertia body and the rolling mass; and thereafter assembling the rolling mass with the inertia body.

* * * * *